US012134104B2

(12) United States Patent
Kew et al.

(10) Patent No.: US 12,134,104 B2
(45) Date of Patent: Nov. 5, 2024

(54) INKJET PRINTHEAD FOR A FLUID

(71) Applicant: ALCHEMIE TECHNOLOGY LIMITED, Cambridge (GB)

(72) Inventors: Simon Kew, Preston (GB); Alan Hudd, Preston (GB); Istvan Ocskai, Preston (GB)

(73) Assignee: ALCHEMIE TECHNOLOGY LIMITED, Cambridge (GB)

( * ) Notice: Subject to any disclaimer, the term of this patent is extended or adjusted under 35 U.S.C. 154(b) by 482 days.

(21) Appl. No.: 17/602,543

(22) PCT Filed: Apr. 9, 2020

(86) PCT No.: PCT/GB2020/050927

§ 371 (c)(1),
(2) Date: Oct. 8, 2021

(87) PCT Pub. No.: WO2020/208360

PCT Pub. Date: Oct. 15, 2020

(65) Prior Publication Data

US 2022/0169021 A1 Jun. 2, 2022

(30) Foreign Application Priority Data

Apr. 9, 2019 (GB) ..................................... 1905015

(51) Int. Cl.
*B05B 12/18* (2018.01)
*B05B 7/08* (2006.01)
*B05B 17/06* (2006.01)

(52) U.S. Cl.
CPC ............ *B05B 12/18* (2018.02); *B05B 7/0815* (2013.01); *B05B 17/0607* (2013.01)

(58) Field of Classification Search
CPC ... B05B 12/18; B05B 7/0815; B05B 17/0607; B41J 2/04581; B41J 2/14201
(Continued)

(56) References Cited

U.S. PATENT DOCUMENTS

| | | | | |
|---|---|---|---|---|
| 4,673,951 A * | 6/1987 | Mutoh | B41J 2/115 347/74 |
| 6,081,281 A * | 6/2000 | Cleary | B41J 2/02 239/270 |

(Continued)

FOREIGN PATENT DOCUMENTS

| | | |
|---|---|---|
| GB | 2482873 A | 2/2012 |
| GB | 2539165 A | 12/2016 |

(Continued)

OTHER PUBLICATIONS

ISR—WO dated Jun. 23, 2020 for parent PCT application No. PCT/GB2020/050927.

(Continued)

*Primary Examiner* — Steven J Ganey
(74) *Attorney, Agent, or Firm* — Vorys, Sater, Seymour and Pease LLP

(57) ABSTRACT

A printhead for dispensing a fluid is provided. The printhead comprises at least one chamber; an array of piezoactuated flow channel dispensers enclosed in the at least one chamber; a multi-orifice dispensing plate; and an air dispensing element comprising a source of compressed air and an air flow controller configured to direct a flow of air.

25 Claims, 8 Drawing Sheets

(58) Field of Classification Search
USPC .............................. 239/102.2, 270, 290, 296
See application file for complete search history.

(56) References Cited

U.S. PATENT DOCUMENTS

| | | | | |
|---|---|---|---|---|
| 7,744,198 | B2 * | 6/2010 | Iwao | B41J 2/14209 347/68 |
| 2007/0057979 | A1 * | 3/2007 | Gardner | B41J 2/2142 347/5 |
| 2007/0263059 | A1 | 11/2007 | Watanabe et al. | |
| 2009/0244202 | A1 * | 10/2009 | Kida | B41J 2/04581 347/68 |
| 2010/0128073 | A1 | 5/2010 | Togawa | |
| 2012/0200619 | A1 | 8/2012 | Bibl | |
| 2013/0249987 | A1 * | 9/2013 | Ottosson | B41J 2/14233 347/68 |
| 2014/0295064 | A1 * | 10/2014 | Nystrom | B41J 2/14282 347/68 |

FOREIGN PATENT DOCUMENTS

| | | | |
|---|---|---|---|
| GB | 2549720 | A | 11/2017 |
| JP | 2003165230 | A | 6/2003 |
| JP | 2008126584 | A | 6/2008 |
| WO | 2002036347 | A2 | 5/2002 |
| WO | 2006064036 | A1 | 6/2006 |
| WO | 2015110179 | A1 | 7/2015 |
| WO | 2020208360 | A1 | 10/2020 |

OTHER PUBLICATIONS

Search and examination report for parent application No. GB1819101.5, Oct. 9, 2019.

* cited by examiner

INKJET PRINTHEAD FOR A FLUID

The present invention relates to a printhead and a system for dispensing fluid, and in particular to a printhead in a fluid dispensing system. The printhead is configured with an array of digitally controlled piezoactuated flow channel dispensers and an air dispensing element and the resulting system is capable of high precision dispensing or dosing of industrial fluids that are required to penetrate or coat materials. Materials to be coated include textiles, paper, tissues, metal surfaces and plastic surfaces.

Precision coating is achieved through digital control of the dispenser orifices, such that 2D and 3D distribution of the industrial fluids can be controlled to within a few percent of a target value. This principle of precision application of fluids for coating or dosing is general and is applicable to many industrial uses. Further example applications include: textile coating, applying pre-treatments to cardboard for printing; fabrication of multi-layer battery materials; fabrication of elements of display devices; 3D printing moulds for metal casting.

Currently, textile coating is an environmentally damaging process, primarily due to the generation of significant volumes of waste water, typically many times the textile weight.

The conventional coating processes are bath immersion coating, spraying and padding with a roller-application mechanism. All of these methods generally overdose the textile material to ensure that the substance to be coated remains present in excess throughout the coating process to avoid the creation of a concentration gradient inclining the substance to be coated to leave the textile material.

Traditionally, bath immersion coating occurs to enable the absorption of the coating material to the fibre surface. The weight of water utilised in this process is frequently many times the weight of the textile, since this is often needed to wash out the excess. Coatings can be substantially insoluble in water, and require time to adsorb onto the fibre surface and diffuse into the fibre to become entrapped. Alternatively, coatings can be applied via a roller “padding” process.

It is against this background that the new industrial apparatus based on this invention for precise dispensing of only the required coating onto a textile substrate without the requirement for application of excess coating has arisen. The disclosed approach enables a step-change in the sustainability profile of the industry through elimination or reduction of washing processes by only dispensing the amount of coating needed. Digital dispensing processes known in the field, namely digital inkjet printing, are not able to dispense fluids at sufficiently high flow rates and with sufficiently high droplet velocities to operate at industrial throughputs and deliver coatings to the internal structure of a 3D substrate respectively.

The apparatus of the present invention is an industrial printhead suitable for applying fluids such as coating to a 2D or 3D substrate, for example, textiles and fabric, via a digitally controlled dosing system, with the advantage that the printhead may deliver coating in the region of the capacity of a textile substrate for absorption of coating. Accordingly, the apparatus of the present disclosure may be used to reduce the need for immersion baths and for washing excess coating from the textiles.

Cardboard is often patterned with coatings to deliver barrier properties, printability and for decoration. These coatings are currently applied using analogue printing techniques or spray coating.

The printhead that is the subject of this invention is capable of digitally patterning a range of low-medium viscosity coatings that cannot be utilised with conventional digital inkjet printheads. This enables precise application of the coating functionality only where needed. For example, in the case of waterproofing carton board, the coating can be applied to the external surfaces of a box only. In the case of pre-treatments for digital printing, the coating can be applied solely to the area that is to be printed.

According to a first aspect of the present invention, there is provided a printhead for dispensing a fluid, the printhead comprising: at least one chamber; an array of piezoactuated flow channel dispensers enclosed in the at least one chamber; a multi-orifice dispensing plate; and an air dispensing element comprising a source of compressed air and an air flow controller configured to direct a flow of air.

Providing a printhead with an array of piezoactuated flow channel dispensers removes the requirement of traditional coating methods to have a bath of coating fluid. Instead, atomised microdroplets of fluid can be dispensed directly onto the material at a controlled velocity.

The air dispensing element may be used to improve the homogeneity of dispensed microdroplets by, for example, deflecting droplets to undercoated regions, or by drying droplets that are too big mid-air. The flow of air also doubles as an integrated cooling system for the printhead.

The piezoactuated flow channel dispensers may be controlled by a processor, and the processor may be configured to control each piezoactuated flow channel dispenser independently. Having flow channel dispensers controlled by a processor, and which can be controlled independently of one another where necessary, allows for precise control of fluid deposition quantity to match a material’s absorbance capacity. This may further enable instant fluid changeover, switching the type of fluid dispensed and enabling the production of a multi-component material in a single dyeing run as well as the possibility of automatic in-line correction of any heterogeneous flaws detected in the material. For example, an amount of fluid to be dispensed from a dispenser can be increased if an under-coated fluid area is detected.

The air dispensing element may be configured to direct a flow of air against the dispensing tips of the flow channel dispensers. Directing the flow of air against the flow channel dispenser tips may reduce the risk of the known problem in printheads of accumulating fluid droplets that could block or reduce the homogeneity of the dispensed fluid.

In some embodiments, the air dispensing element may be configured to direct a single flow of air against at least one dispensing tip of at least two flow channel dispensers. Directing a single flow of air against two flow channel dispenser tips may reduce, by up to half, the number of air dispensing elements that are required, resulting in less maintenance of the printhead, less compressed air being required and an overall cheaper solution and more homogenous printhead.

The air dispensing element may be configured to direct the flow of air substantially parallel to the flow of fluid dispensed from the flow channel dispensers to deflect the dispensed fluid in a controlled manner. Directing the air flow substantially parallel to the flow of fluid allows guiding of the fluid droplets to form a homogenous and more precisely directed droplet distribution. Furthermore, deflecting the dispensed fluid with the flow of air may advantageously control the spread area of the fluid onto the material, allowing real-time, versatile control of the application of fluid to a textile.

The air dispensing element may be configured to apply the flow of air periodically at a frequency in the range of 1-1,000 Hz. Periodic deflection of the spray may be used to increase the averaging between adjacent nozzles and increase the homogeneity of dispensed fluid across the array of flow channel dispensers.

The gas being dispensed may comprise compressed air and/or may be compressed air. Alternatively, or in addition, the gas being dispensed may comprise an inert gas, such as helium or nitrogen or a reactive gas such as ammonia. The gas being dispensed may comprise a plurality of gaseous components.

The or each chamber may be filled with a fluid of known composition and flow profile such that there is a controlled pressure in the chamber that can be negative or positive. Filling the chamber containing the internal components of the printhead with a well characterized fluid may reduce undesirable evaporation and dropping of fluid from the nozzles of the flow channel dispensers, as well as helping to seal the chamber from external contamination. Further, a controlled pressure may help to maintain a consistent flow rate from the flow channel dispensers.

The printhead may further comprise a sealing layer configured to resist fluid flow through the orifices of the multi-orifice dispensing plate.

The tips of the flow channel dispensers may be configured to be in contact with and to protrude through openings in the sealing layer, and may be further configured to move relative to the sealing layer with minimal friction or mechanical resistance when piezoelectrically actuated.

The sealing layer may provide additional protection to the printhead components enclosed in the chamber, and reduce unwanted leakage of the dispensed fluid. Having the nozzle tips of the flow channel dispensers protrude through the sealing layer whilst being in contact with it allows the sealing layer to function without inhibiting the actual process of dispensing the fluid.

The sealing layer may be a viscoelastic membrane comprising multiple openings, the membrane covering each orifice of the multi-orifice dispensing plate. Further, a diameter of each opening of the membrane through which the flow channel dispensers are configured to protrude may be smaller than the diameter of the tip of the flow channel dispensers. This may allow sealing of the printhead by intimate contact between the nozzle tips and the membrane whilst providing minimal mechanical interference with the piezoelectric movement.

In some embodiments, a diameter of each opening of the sealing layer through which the flow channel dispensers are configured to protrude may be larger than the diameter of the tip of the flow channel dispensers. A slightly loose seal between the sealing layer and the dispenser(s) may prevent the resonant frequency of the dispenser from being altered or adjusted.

Alternatively, or in addition, the sealing layer may provide damping to the dispenser. In some embodiments, this damping may be undesirable. For example, in use, the dispenser element may vibrate and produce a standing wave, wherein the standing wave may comprise at least one node and at least one antinode. The sealing layer may therefore be located at or substantially near to the location of a node, wherein the node is a point at which the amplitude of vibration in a standing wave system is zero. Doing so may reduce, or even eliminate, the damping effect of the seal on the vibration of the node. This ensures that the dispensing properties of the dispenser element can remain optimal.

In some embodiments, damping provided by the sealing layer is desirable and the diameter of the opening through which the flow channel dispensers are configured to protrude may be configured to provide the dispenser with a desirable amount of damping in order to achieve a pre-specified resonant frequency.

The sealing layer may be composed of a non-wetting elastomer or an elastomer provided with a non-wetting coating. The sealing layer may be composed of a hydrophobic material and/or may comprise a hydrophobic coating.

In some embodiments, the sealing layer may be composed of metal or alloy. The metal or alloy may comprise steel and/or aluminium. In some embodiments, the sealing layer may comprise a coating layer. The coating layer may comprise polytetrafluoroethylene.

A metal or alloy sealing layer may comprise a small gap between the sealing layer and the dispenser element. In such an embodiment, the printhead may be pressurised, hence causing a fluid flow from inside the printhead to outside the printhead. The fluid flow may be continuous, substantially parallel to the dispenser element and may be configured to prevent contaminants from entering the printhead as this would require a contaminant to move against the direction of the fluid flow.

Alternatively or additionally, the multi-orifice dispensing plate and/or the tips of the flow channel dispensers may be provided with a non-wetting coating and/or may be manufactured using a hydrophobic material and/or a hydrophobic coating.

The hydrophobic material and/or coating may comprise silicone and/or polytetrafluoroethylene.

A non-wetting and/or hydrophobic material and/or coating may prevent aqueous fluids from accumulating by, in or around the seals.

The flow rate through a given flow channel dispenser may be controlled by a duty cycle of the given flow dispenser.

The velocity of fluid dispensed by the printhead may be controllable by a voltage determined by the processor.

The processor may be configured to control a spread of dispensed fluid based on a digital image.

The piezoactuated flow channel dispensers may be controlled based on real-time feedback received by the processor. The real-time feedback may include at least one of: coat weight detection; colour detection; flow rate detection; nozzle resonant frequency; and electrical drive requirements for each nozzle.

In some embodiments, the piezoactuated flow channel dispensers may be horizontal relative to a substrate on which fluid is to be dispensed. In some embodiments, the piezoactuated flow channel dispensers may be tilted relative to a substrate on which fluid is to be dispensed to prevent fluid wicking into the nozzle sealing area.

In some embodiments, the flow channel dispensers may be titled up to 90, 60, 45, 30, 25, 20, 15, 10 or 5 degrees from the horizontal. In some embodiments, the flow channel dispensers may not be tilted. For example, the flow channel dispensers may be titled between 0 and 60 degrees, more preferably between 5 and 45 degrees and most preferably between 10 and 30 degrees.

In some embodiments, the channel dispenser element is located substantially below the base of the tank. This may help to ensure that fluid within the dispenser element flows out of the dispenser and does not clog up or block the fluid path.

The printhead may be moved relative to the substrate in a reciprocating motion to distribute the dispensed fluid over a large area. The motion may be controlled based at least in part on real-time feedback received by the processor.

The real-time feedback may be based on colour detection across the substrate.

There may be increased air pressure in the printhead causing a flow of air in a direction from inside the at least one chamber towards the tips of the flow channel dispensers.

The printhead may further comprise an additional chamber enclosing the tips of the flow channel dispensers.

The printhead may further comprise a cooling mechanism, wherein the cooling mechanism may comprise a casing operably connected to the printhead. The casing may be configured to comprise a fluid, such as water or air, wherein the fluid is configured to absorb heat from the printhead, hence cooling the printhead. In some embodiments, where a plurality of printheads is present, water cooling may be the preferred cooling mechanism.

Alternatively, or in addition, each printhead may comprise a fan configured to circulate/move warm air in the vicinity of the printhead, replacing it with cooler air and hence cooling the printhead. In some embodiments, where a single printhead is present, air cooling may be the preferred cooling mechanism.

Furthermore, according to the present invention, there is provided a system for supplying a plurality of printheads with fluid, the system comprising: a plurality of tanks for holding fluid to be dispensed from the plurality of printheads; a fluid supply chamber; a sensor for detecting a fluid level in the fluid supply chamber; and a recirculating feed for controlling a feed rate and drain rate between the fluid supply chamber and each of the plurality of tanks, wherein the fluid feed rate and the fluid drain rate are determined by the processor based at least in part on the fluid level detected by the sensor.

Having a dynamic, digitally-controllable recirculating feed to multiple printheads allows a system to maintain a sufficient level of fluid in each of the tanks at all times, and to return unneeded fluid to a main tank, reducing waste fluid, keeping a constant fluid flow, thus increasing efficiency.

In some embodiments, the system may comprise a single tank for holding fluid to be dispensed from the plurality of printheads.

The feed rate and drain between the fluid supply chamber and each of the plurality of tanks may be the same for each tank. Maintaining a uniform feed rate and drain rate to each of the plurality of header tanks may cause the level of fluid in each tank to be approximately the same, and thus able to be determined by a single sensor controlling the feed rate and drain rate from a single fluid supply chamber. This reduces the cost and complexity of the assembly by allowing one sensor to effectively monitor multiple header tank fluid levels.

The sensor may be a capacitive sensor, and the system may be configured to: in response to the sensor switching on, increase the feed rate to each of the plurality of tanks and decrease the drain rate from each of the plurality of tanks; and in response to the sensor switching off, decrease feed rate to each of the plurality of tanks and increase the drain rate from each of the plurality of tanks.

In some embodiments, the sensor may be configured to measure the hydrostatic head of the fluid in the tank. In embodiments where a plurality of tanks is provided, a sensor is provided to measure the hydrostatic head in each of the tanks.

Alternatively or additionally, the sensor may be a pressure sensor, and the system may be configured to: increase the feed rate to each of the plurality of tanks and decrease the drain rate from each of the plurality of tanks in response to the sensor detecting a low pressure; and decrease feed rate to each of the plurality of tanks and increase the drain rate from each of the plurality of tanks in response to the sensor detecting a high pressure.

At least one fluid flow path may connect an inlet and an outlet of each of the plurality of tanks to the fluid supply chamber, and the fluid flow paths for each tank may be of equal resistance.

The outlet of each tank may be located at a higher level than the inlet of each tank and may create a maximum fluid level for each tank based on the principle of a weir.

Each of the plurality of tanks may further comprise a vacuum bleed valve located adjacent to the tank inlet, the vacuum bleed valve may be configured to provide a low resistance flow path if pressure in the tank exceeds a predetermined limit. The header tank pressure may be stabilised by using a vacuum bleed valve near to the fluid supply, which allows overpressure, caused by rapid increases in tank fluid height to be minimised by allowing air to escape from the headspace via a low resistance route.

The system may further comprise at least one vacuum pump, the vacuum pump may be configured to control the pressure in each of the plurality of tanks. The header tank pressure may set using a vacuum applied to the headspace. As the dispensing of fluid from the printhead is very sensitive to fluid pressure in the tank, precise dispensing of fluid is highly dependent on stable header tank pressure.

Each tank of the plurality of tanks may further comprise an adjustable partition configured to control the fluid level in its respective tank based on the principle of a weir.

The fluid outlet of each tank of the plurality of tanks may be adjustable and configured to control the fluid level in its respective tank by adjust the level at which fluid is drained.

The pressure control of the system may be a closed loop, with a latency of less than 1 second per adjustment.

The system may be further configured to heat and/or stir the fluid.

The system may be further configured to degas and/or filter the fluid.

The system may comprise a pump used to recirculate fluid within each tank.

The system may further comprise an infrared heater configured to minimise fluid migration and maximise homogeneity of the dispensed fluid on the textile.

The system may further comprise a vacuum pump configured to control the airflow penetration into the textile. The vacuum pump may be operably connected to a channel, wherein the channel is located substantially below the printhead. More specifically, the channel may be located substantially below the textile configured to receive the fluid dispensed from the printhead.

The channel may be negatively pressurised by means of the vacuum pump and may be configured to draw air from the vicinity of the dispenser element, through the textile and into the channel. Doing so may further reduce the spread of fluid being dispensed from the printhead and/or may increase the control of the fluid penetration into the textile.

The system may further comprise a filter located between the channel and the textile, the filter being configured to prevent fluid and/or contaminants from entering the channel. The filter may be disposable and/or removable. Once removed the filter may be cleaned and reused. The addition of a filter to prevent fluid and/or contaminants from entering the channel will also prevent the same from entering the vacuum pump, hence reducing the maintenance requirements of the system.

According to the present invention there is further provided a method for filling, refiling and/or draining a fluid in the at least one tank. The method of filling and/or re-filling the tank may comprising at least one of the following steps: feeding the printhead from a supply tank, negatively pressurising the tank to prevent fluid from dripping from the dispenser element filling the tank to a target level with a desired fluid, such as ink; establishing recirculation in the tank; and reducing the negative pressure in the tank in order to fully fill the dispenser element, ensuring that a pendant drop does not form at the nozzle.

The method of draining the tank may comprise at least one of the following steps: negatively pressurising the tank to prevent fluid from dripping from the dispenser element; shutting down the fluid supply into the tank; and draining the tank to a supply tank using a return pump.

The method of draining the tank may further comprise the step of adding a detergent composition to the tank and repeating the aforementioned steps. The detergent composition may be water and sodium dodecylsulfate. Adding a detergent composition ensures that any remaining fluid in the tank is diluted and subsequently drained from the tank. This step may be repeated a plurality of times until the tank is determined to be clean by checking the fluid output from the nozzles.

In some embodiments, the tank may be negatively pressurised such that the fluid in the dispenser element is entirely withdrawn back into the tank.

In some embodiments, the internal surfaces of the tank may be coated with a hydrophobic material, such as polytetrafluoroethylene. A hydrophobic coating enables the fluid to be more easily drained from the tank. In addition such a coating reduces maintenance costs arising from the requirement to clean the tank between draining and refilling.

The present invention will now be further described, by way of example only, with reference to the accompanying figures in which.

Figure 3A:
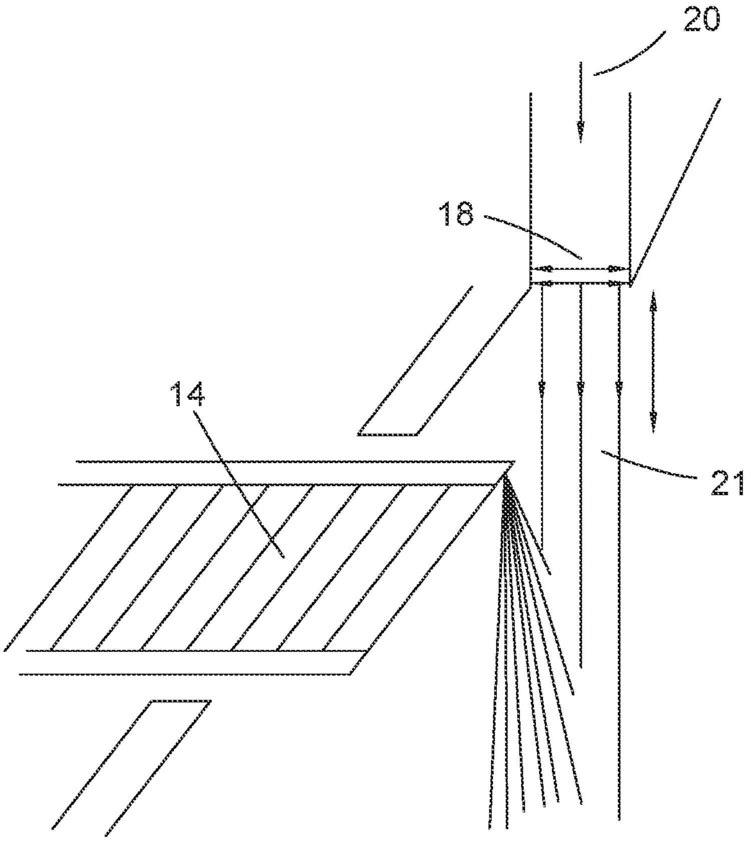
Figure 3B:
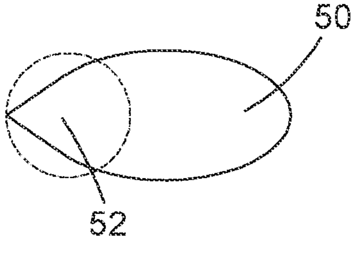
Figure 4:
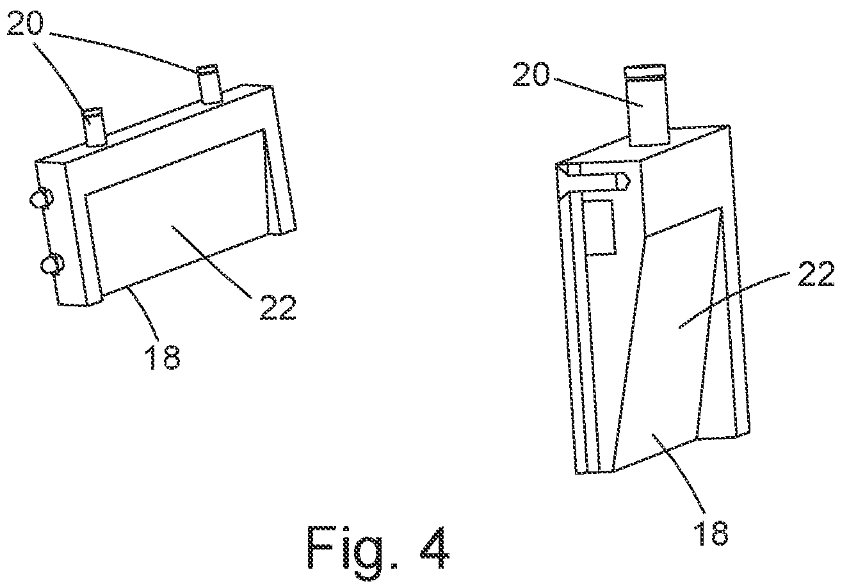
Figure 5A:
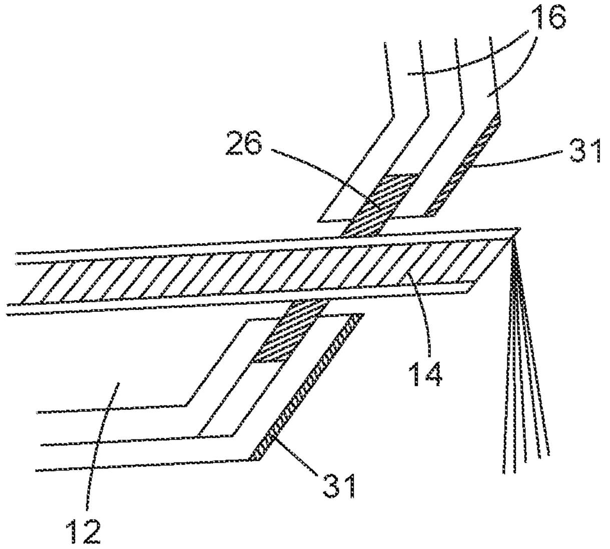
Figure 5B:
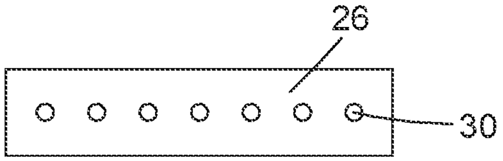
Figure 6:
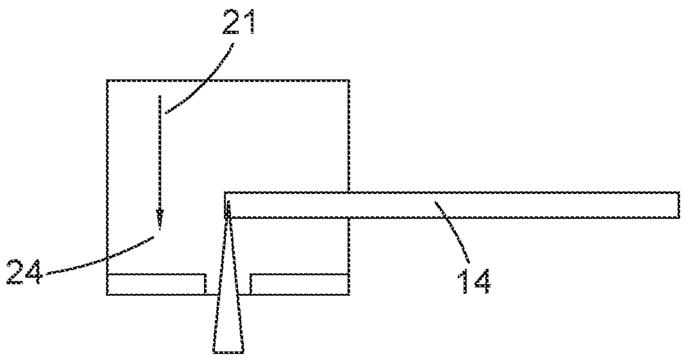
Figure 7:
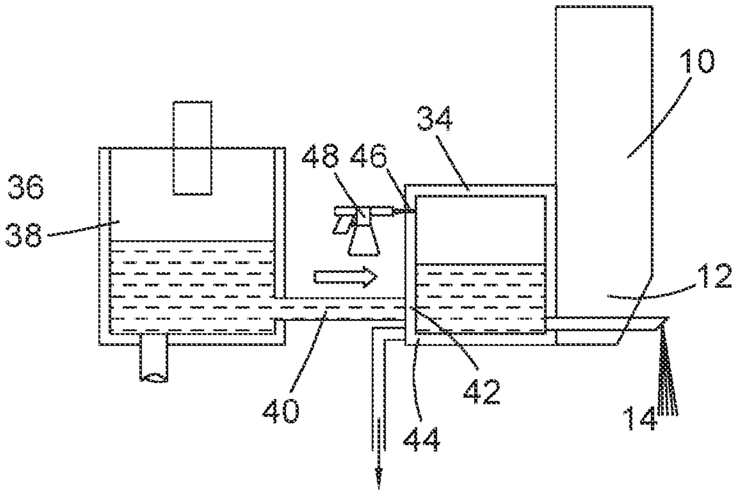
Figure 8A:
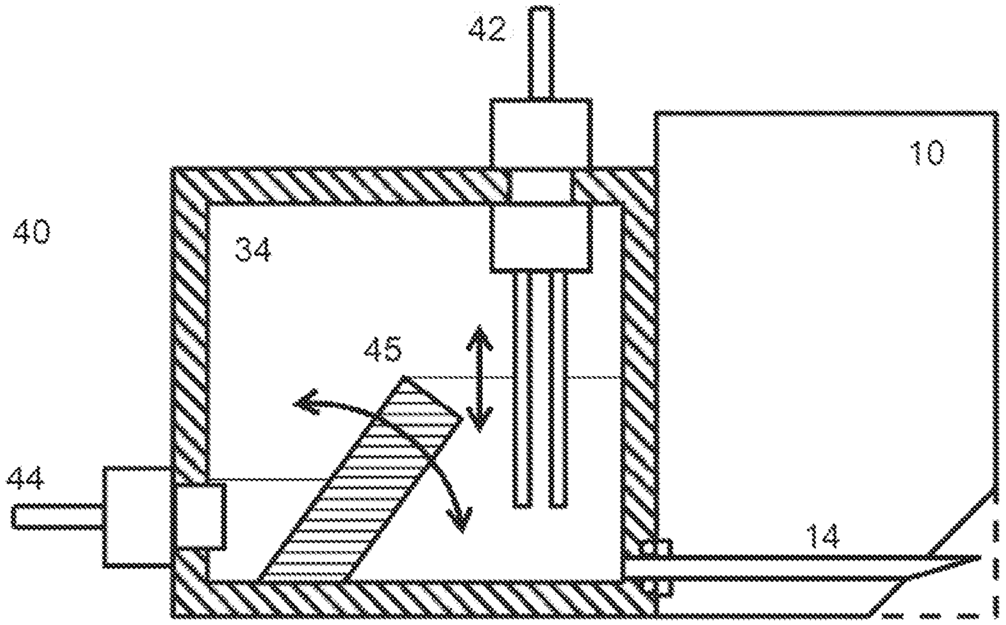
Figure 8B:
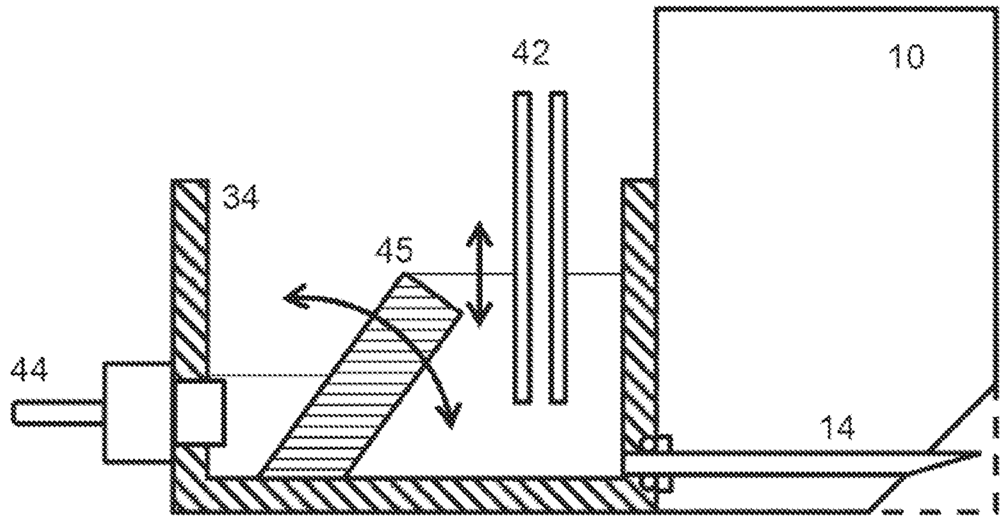
Figure 9A:
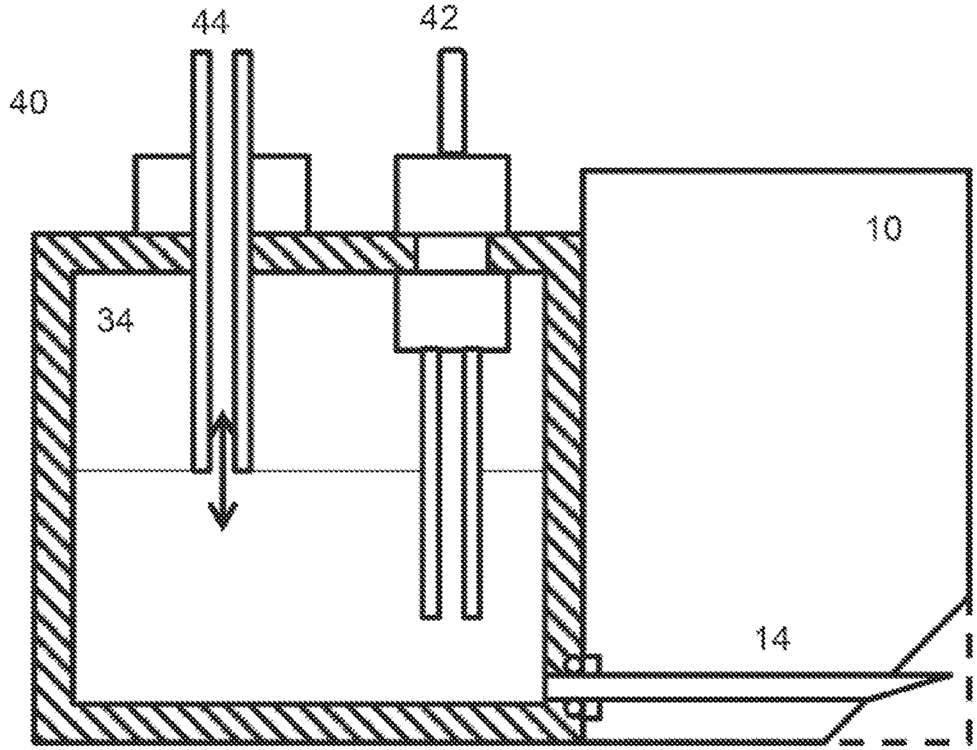
Figure 9B:
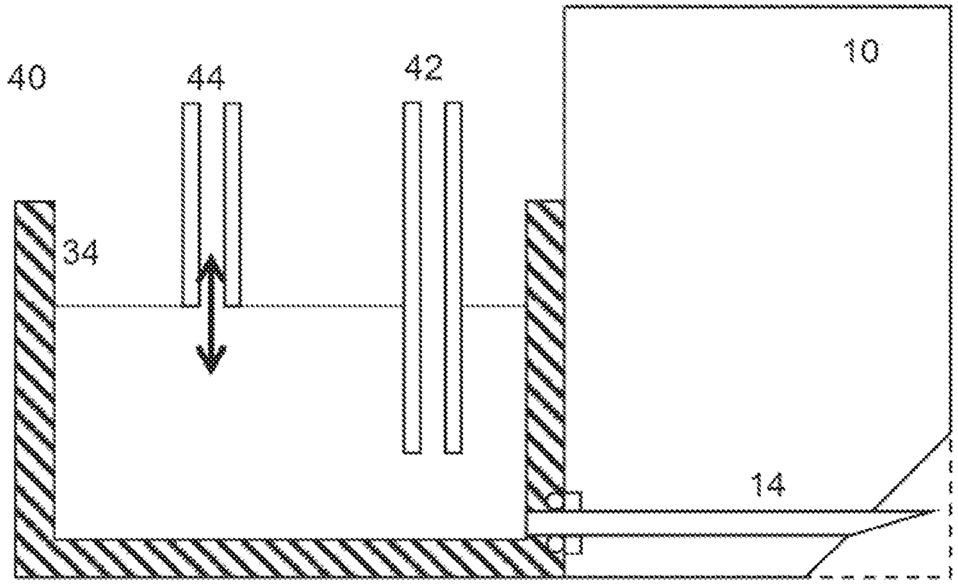
Figure 10:
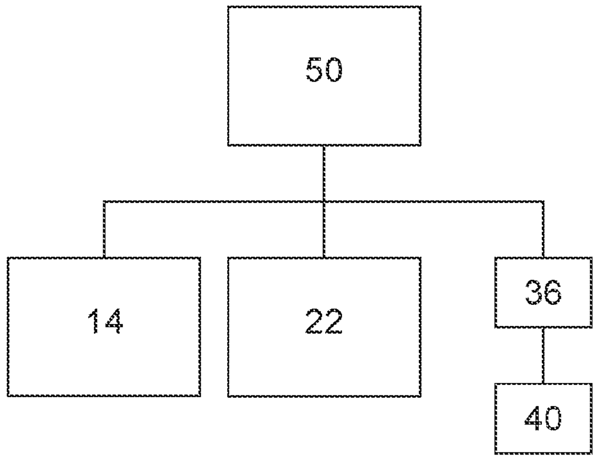

FIG. 3A a side view of an example configuration of an air dispensing element directing a flow of air against the tip of a piezoactuated flow channel dispenser;

FIG. 3B shows an illustration of the effect of the air dispensing element on an example droplet spread;

FIG. 4 shows an example configuration of an air flow controller of the air dispensing element;

FIG. 5A shows a side view of an example configuration of a sealing layer in contact with a flow channel dispenser;

FIG. 5B shows a top view of an example sealing layer component comprising multiple openings;

FIG. 6 shows one possible configuration of the chamber enclosing the piezoactuated flow channel dispensers, wherein there is an additional chamber placed around the tips of the flow channel dispensers that is used to control the airflow and gas composition around the dispenser tip;

FIG. 7 shows a system for supplying fluid to a printhead such as either of the printheads of FIG. 1;

FIGS. 8A and 8B illustrate embodiments wherein the fluid level and meniscus pressure in each header tank are controlled by an adjustable weir;

FIGS. 9A and 9B illustrate embodiments wherein the outlet of each header tank is adjustable; and FIG. 10 shows a block diagram of the digital components of a system according to the present invention.

In order further to explain various aspects of the present disclosure, specific embodiments of the present disclosure will now be described in detail in conjunction with the accompanying drawings.

Figure 1A:
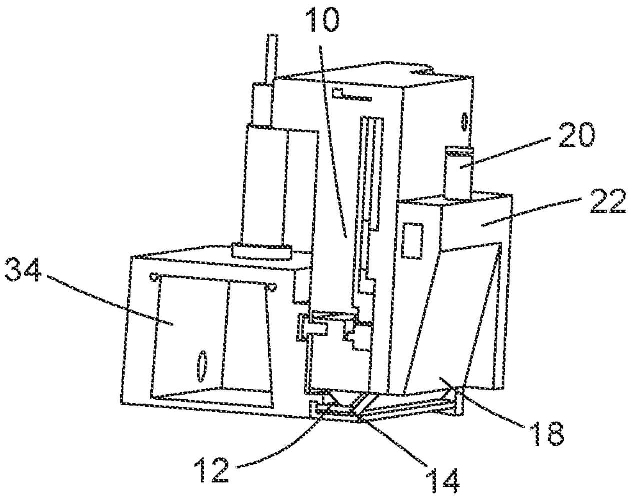
FIG. 1A shows an example of a printhead according to the present invention.
Figure 1B:
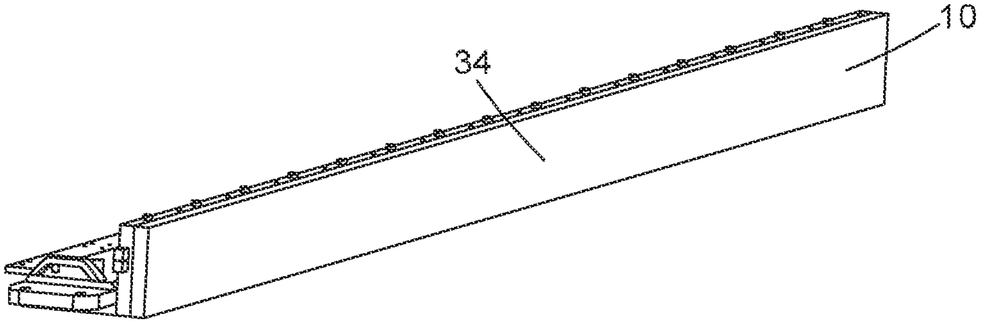
FIGS. 1B, 1C and 1D show isometric and side views of another example of a printhead according to the present invention.
Figure 1C:
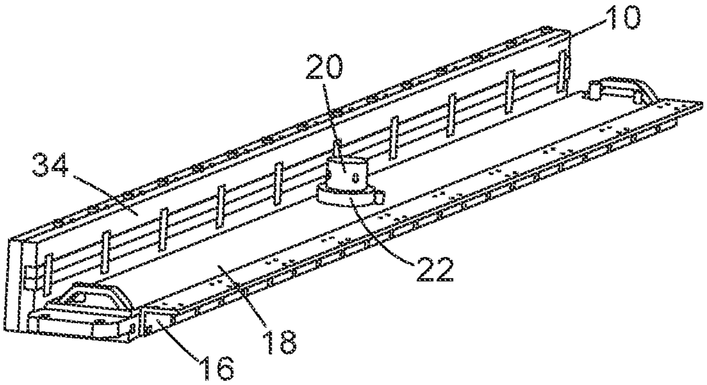
Figure 1D:
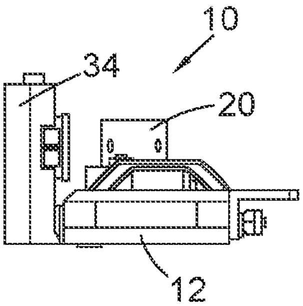

Referring to FIGS. 1A, 1B, 1C and 1D, there are shown two examples of a printhead 10. The example shown in FIG. 1A is a compact printhead 10 with a modest array of 48 piezoactuated flow channel dispensers 14 providing a print width of 121 mm. FIGS. 1B, 1C and 1D are side and isometric views of a 1.8 m wide printhead comprising an elongate a chamber 12 and a large array of 720 piezoactuated flow channel dispensers 14 enclosed in the chamber 12. The piezoactuated flow channel dispensers 14 are, for example, in the form of hollow needles suitable for directing a fluid flow. The two examples illustrated in FIGS. 1A to 1D comprise the same key features and the following description applies equally to each example.

Figure 2A:
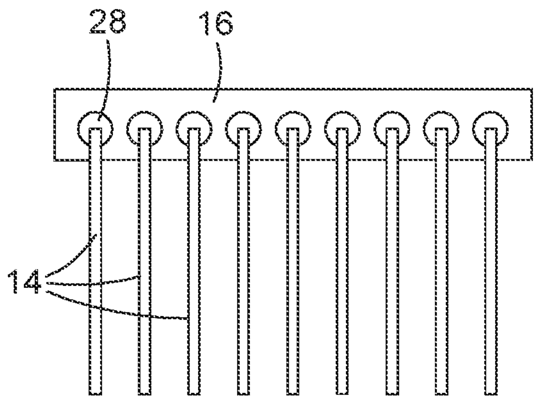
FIG. 2A shows a top view of an example array of piezoactuated flow channel dispensers and a multi-orifice dispensing plate that form part of either of the printheads of FIG. 1.

The printhead 10 further comprises a multi-orifice dispensing plate 16 through which the tips of the piezoactuated flow channel dispensers 14 are configured to protrude. As illustrated in FIG. 2A, the tips of the flow channel dispensers 14 are in the form of nozzles suitable for dispensing fluid.

Advantageously, providing an array of piezoactuated flow channel dispensers 14 removes the requirement of traditional coating methods of needing a bath of fluid containing excess amounts of coating. Instead, the apparatus of the present disclosure is configured to dispense atomised microdroplets of fluid directly onto a substrate material, such as a textile or fabric, at a controlled velocity.

The printheads 10 illustrated in each of FIG. 1A and FIGS. 1B, 1C and 1D further comprise an air dispensing element 18, the air dispensing element 18 comprising a source of compressed air 20 and an air flow controller 22 configured for directing a flow of air 21.

Air dispensing element 18 can be used to improve the homogeneity of dispensed microdroplets on a substrate by controlling the spread of droplets and deflecting droplets to undercoated regions, or alternatively applying the flow of air 21 to dry droplets that are too big mid-air.

The flow of air 21 dispensed from the air dispensing element 18 may simultaneously act as an integrated cooling system to prevent the printhead 10 from overheating.

Also illustrated in FIGS. 1A to 1D is a tank 34, referred to from hereon in as a "header tank". The header tank 34 is configured for holding fluid to be dispensed from the printhead 10. In the example shown in FIG. 1A, the tank holds between 100 ml and 2.51 of fluid to be dispensed.

Referring now to FIG. 2A, an example configuration of the array of flow channel dispensers 14 is illustrated in more detail.

In the configuration illustrated, the lengths of the flow channel dispensers 14, which are in the form of hollow needles, are substantially perpendicular to the direction of the dispensed fluid with nozzle tips of the needles protruding through orifices 28 of the multi-orifice dispensing plate 16.

The flow channel dispensers 14 are configured such that they dispense fluid in response to actuation by perpendicular piezoactuators (not shown).

In particular, upon actuation, each of the flow channel dispensers 14 dispense very small or atomised droplets of fluid in a direction substantially perpendicular to the length of the flow channel.

The piezoactuators are not illustrated, however in one embodiment, flow channels may be actuated by a multiplicity of piezoactuators in contact with the needles of the flow channel dispensers. For example, there may be two piezoactuators attached perpendicular to the flow channel, enabling control of the flow channel perpendicular to the direction of the substrate onto which fluids are being deposited.

The configuration of the flow channels and the actuators enables several elements of resolution control to be achieved: fixed offsets perpendicular to the substrate travel direction of individual nozzles in an array; oscillation perpendicular to the substrate travel direction, and deposition width of the dispensed fluid.

In some embodiments, including that shown schematically in FIG. 8, the array of piezoactuated elements 14 is operated by a processor 50, for example, a microprocessor. The processor 50 is configured to control each piezoactuated flow channel dispenser independently such that individual dispensers are operated to dispense less or more fluid or to dispense at different frequencies.

Having flow channel dispensers 14 controlled by the processor 50, and which can be controlled independently of one another where necessary, allows for precise control of fluid deposition quantity to match a material's determined absorbance capacity. This also enables instant fluid changeover, switching the type of fluid dispensed onto a substrate material and thus enabling the production of a multi-component material in a single coating run.

Furthermore, if a flaw is detected in the homogeneity of fluid dispensed on a substrate material, the above-described configuration allows automatic in-line correction of such heterogeneities. For example, an amount of fluid to be dispensed from a dispenser can be increased if an under-coated fluid area is detected.

Although the array of piezoactuated flow channel dispensers 14 are illustrated as a single row of straight needle-like dispensers of uniform length, other configurations of the array are contemplated herein. For example, the array may comprise multiple rows of dispensers, or dispensers of varying length. The flow channel dispensers 14 may be curved, or at different angles with respect to each other.

Figure 2B:
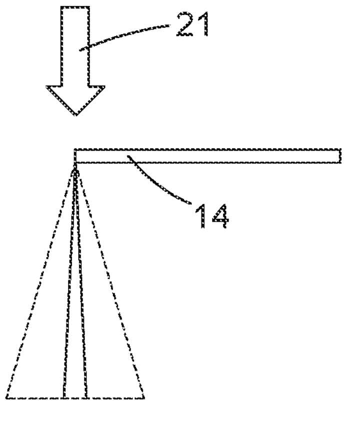
FIG. 2B shows a side view of an example piezoactuated flow channel dispenser dispensing a fluid.

FIG. 2B illustrates a side view of a single flow channel dispenser 14 in the configuration described above in relation to FIG. 2A. Further, a flow of air 21 from air dispensing element 18 is shown being applied to the nozzle of the flow channel dispenser 14. In some embodiments, the flow of air 21 is substantially parallel to the direction of travel of the dispensed fluid.

Referring now to FIG. 3A, the air dispensing element 18 of the printhead 10 is shown being configured to direct a flow of air 21 against the dispensing tips of the array of flow channel dispensers 14. The flow of air 21 is in a direction substantially perpendicular to the lengths of the flow channel dispensers 14 and substantially parallel to the direction of travel of dispensed fluid.

In doing so, the air dispensing element 18 deflects droplets of fluid dispensed from the flow channel dispensers 14 in order to control a spread profile of droplets of the dispensed fluid on a substrate on which fluid is being dispensed.

An example droplet spread profile is illustrated in FIG. 3B, which shows the shape of the droplet profile 50 without the applied flow of air 21 from the air dispensing element 18 and the shape of the droplet profile 52 with the applied flow of air 21 from the air dispensing element 18.

Beneficially, controlling the droplet profile and spread enables the fluid to be dispensed at a higher resolution. The velocity of the air flow 21 can be controlled by air flow controller 22 to achieve the desired resolution, and it is possible to use the air flow to deflect and thus direct the dispensed fluids.

Furthermore, directing the flow of air 21 against the flow channel dispenser tips reduces the risk of a known problem in printheads for dispensing other types of fluid such as inks, wherein dispensed fluid accumulates on the nozzle tips of dispensing elements and blocks the nozzles or reduces the homogeneity of the dispensed fluid.

The ability to deflect dispensed fluid with the flow of air 21 and thus control the spread area of the fluid onto the material also allows real-time, versatile control of the application of fluid to a textile.

In some embodiments, the air flow controller 22 of the air dispensing element 18 is configured to cause the flow of air 21 to be applied to the dispensed droplets periodically. For example, the air flow controller can cause the flow of air to be dispensed at a frequency in the range of 1-1,000 Hz.

Periodic deflection of the spray may be used to increase the averaging between adjacent nozzles and increase the homogeneity of dispensed fluid across the array of flow channel dispensers.

In some embodiments, the air flow is driven at a pressure in the range 2-10 PSI or 14-69 kPa and at a flow rate of 1-100 cubic ft per minute or 0.00047-0.047 $m^3s^{-1}$.

Referring now to FIG. 4, an example configuration of the air dispensing element 18 for directing a flow of air 21 is illustrated in more detail.

As shown, the air dispensing element is enclosed in a casing designed to funnel and direct a flow of air from a source of compressed air 20. The casing is configured to be wider closer to the supply from the source of compressed air 20 and become narrower at the point in the casing from which air is dispensed. Such a configuration enables the flow of air 21 to be dispensed at high speed and with a high resolution.

Air flow controller 22 may take the form of a valve inside the casing for controlling whether or not air is dispensed. Air flow controller 22 is digitally controlled by a processor. For example, air flow controller may be controlled by processor 50.

Referring now to FIG. 5, a further aspect of the present disclosure is described, wherein the printhead 10 further comprises a sealing layer 26 configured to resist fluid flow through the orifices 28 of the multi-orifice dispensing plate 16.

The sealing layer 26 is configured with a number of openings 30, each of which is configured to align with the orifices 28 of the multi-orifice dispensing plate 16 through which the tips of the array of flow channel dispensers 14 protrude. The diameter of each opening 30 of the sealing layer 26 through which the flow channel dispensers are configured to protrude is smaller than the diameter of the tips of the flow channel dispensers 14, such that the protruding tips are placed in intimate contact with the edges of the openings 30 of the sealing layer 26, effectively sealing the chamber 12 of the printhead 10.

In an exemplary embodiment, the sealing layer 26 is a multi-orifice plate composed of a viscoelastic material such as silicone or a fluoropolymer. The sealing layer 26 may, for example, be a viscoelastic membrane. The orifice in the sealing layer is typically around 10% smaller in diameter than that of the tip of the flow channel dispensers 14. For example, a flow channel dispensing needle with an outer diameter of 900 microns should be sealed by an opening of 800 microns in diameter.

The above-described configuration effectively seals fluids inside the chamber 12 whilst enabling movement of the flow channel dispensers 14 relative to the sealing layer with minimal friction or mechanical resistance when the flow channel dispensers 14 are actuated. Accordingly, the sealing layer of the present disclosure does not inhibit the dispensing of fluid.

In some embodiments, the sealing layer 26 is composed of a non-wetting elastomer or an elastomer provided with a non-wetting coating 31. Optionally, the multi-orifice dispensing plate 16 and the tips of the flow channel dispensers 14 are also provided with a non-wetting coating. The sealing layer and the non-wetting coating provide additional protection to the components enclosed in the chamber, and reduce unwanted leakage of the dispensed fluid.

The non-wetting coatings are selected from any of the following materials: hydrophobic polymers such as: parylene, fluoropolymers, polyolefins, polyimide. In some embodiments, the anti-wetting, low adhesion surface coating described herein is a reaction product of a reactant mixture. The reaction mixture may be composed of at least one triisocyanate and a perfluoropolyether diol compound comprising an ethoxylated spacer. In some embodiments, suitable triisocyanates are obtained under the name Desmodur® Mondur® or Impranil® for example, Desmodur® N 3300, Desmodur® N 3790, available from Bayer Materials Science. Referring now to FIG. 6, an exemplary configuration of the chamber 12 enclosing the piezoactuated flow channel dispensers 14 is shown, wherein the chamber 12 comprises an additional chamber 24 enclosing the tips of the flow channel dispensers 14, and that is used to provide a further degree of control of the airflow and gas composition around the dispenser tip.

For example, the additional chamber can be filled with a fluid of known composition and flow profile such that there is a controlled pressure in the chamber in the range −100 to 1000 mm $H_2O$ or −980 to 9800 Pascal. In some embodiments, the same or a different controlled pressure is applied to chamber 12.

Filling the chamber 12 containing the internal components of the printhead 10 with a well-known fluid reduces undesirable evaporation or dropping of fluid from the nozzles of the flow channel dispensers 14, as well as helping to seal the chamber 12 from external contamination. Further, a controlled pressure helps to maintain a consistent flow rate from the flow channel dispensers 14.

Referring to FIG. 7, a system 32 for supplying a plurality of printheads with fluid will now be described. The printheads to be supplied with fluid are, for example, the same as printhead 10 described above.

The system 32 comprises a plurality of header tanks 34 corresponding to each of the plurality of printheads 10 such that each header tank 34 contains fluid to be dispensed by each respective printhead 10. The system 32 further comprises a fluid supply chamber 38 for supplying fluid to each of the plurality of tanks 34 and a sensor 36 for detecting a level of fluid in the fluid supply chamber.

The system 32 further comprises a digitally controlled recirculating feed 40 for controlling a feed rate and drain rate between the fluid supply chamber 38 and each of the plurality of tanks 34, wherein the fluid feed rate and the fluid drain rate are determined by a processor based at least in part on the fluid level detected by the sensor 36.

Each header tank 34 comprises an inlet 42 for receiving fluid from the recirculating feed and an outlet 44 through which fluid is drained by the recirculating feed 40 and funneled back to the fluid supply chamber 38.

The above mentioned aspects of system 32 provide for a dynamic, digitally-controllable system capable of maintaining a sufficient level of fluid in each of the header tanks 34 at all times, and to return unneeded or unused fluid to the fluid supply chamber 38. This reduces waste fluid, keeps a constant fluid flow to reduce the risk of blockage, and increases efficiency.

Furthermore, in some embodiments, the feed rate and drain between the fluid supply chamber 38 and each of the plurality of header tanks 34 is the same for each tank and a fluid flow path between the fluid supply chamber 38 and each header tank 34 is of equal resistance, maintaining a substantially uniform flow of fluid in and out of each header tank 34.

Maintaining a substantially uniform feed rate and drain rate to each of the plurality of header tanks 34 causes the level of fluid in each tank to be approximately the same, and thus able to be determined by a single sensor controlling the feed rate and drain rate from the single fluid supply chamber 38. This configuration reduces the cost and complexity of the assembly by allowing a single sensor 36 to effectively monitor and maintain multiple header tank fluid levels.

Accordingly, in the above configuration, in response to the sensor 36 detecting that a fluid level has reached above a certain point in the fluid supply chamber 38, the system is configured to increase the feed rate to each of the plurality of tanks 34 and decrease the drain rate from each of the plurality of tanks 34. Similarly, in response to the sensor detecting that the fluid level in the fluid supply chamber 38 has reached below a certain point, the system 32 is configured to decrease feed rate to each of the plurality of tanks 34 and increase the drain rate from each of the plurality of tanks.

In some embodiments, the above configuration enables a periodically fluctuating level fluid level in the fluid supply chamber 38 of less than 1 mm in variation, and maintaining of a tank pressure within a +/−0.5 mm range.

The level in the fluid supply tank is maintained by an infeed and out feed pump.

In some embodiments the sensor is a capacitive sensor with an on/off level change of +/−0.25 mm. The infeed pump is programmed to increase flow rate above the out feed pump when the level sensor is off, increasing the tank level and when the level sensor is on, the opposite occurs, decreasing the tank level.

In some embodiments, the fluid outlet of each header tank 34 is located at a higher level than the inlet 42 of each tank 34 and creates a maximum fluid level for each tank in case of accidental oversupply of fluid.

In some embodiments, each of the plurality of tanks 34 further comprises a vacuum bleed valve 46 located adjacent to the tank inlet 42. The vacuum bleed valve is configured to provide a low resistance flow path if pressure in the tank 34 exceeds a predetermined limit. This aspect of system 32 ensures header tank pressure can be stabilised against overpressure, caused by rapid increases in tank fluid height, to be minimised by allowing air to escape from the headspace via a low resistance route.

The dispensing of fluid from the printhead is very sensitive to fluid pressure in the tank, fluctuations above 2 mm $H_2O$ or 20 Pa are observed in the dispensing of fluids.

Accordingly, precise dispensing of fluid is highly dependent on stable header tank pressure.

Accordingly, in some embodiments, the system further comprises at least one vacuum pump 48, the vacuum pump configured to control the pressure in the headspace of each of the plurality of header tanks 34. The vacuum pump is may be a high frequency piezoelectric air pump, to minimise periodic fluctuations in pressure.

Referring now to FIGS. 8A, 8B, 9A and 9B, example configurations of the header tanks 34 and recirculating feed 40 will be described in more detail.

FIGS. 8A and 8B illustrate embodiments wherein the fluid level and meniscus pressure in each header tank 34 of the plurality are controlled by an adjustable weir 45. In particular, each header tank 34 is configured with the fluid inlet 42 feeding fluid into a first portion of the tank from above, and with a rotatable, retractable, or otherwise adjustable, weir partitioning the first portion from a second portion of the tank, wherein the fluid outlet 44 is located low down on a wall of the second portion of the tank 34.

In such a configuration, rotating, retracting, or otherwise adjusting the height of the adjustable weir 45 will allow control of the fluid level in the tank by changing the level at which fluid in the first portion of the tank spills over the weir into the second portion of the tank and is drained away through the fluid outlet 44. Such a configuration eliminates the need for a vacuum pump.

In FIG. 8A, the header tank 34 is illustrated in a closed configuration. In FIG. 8B header tank 34 is illustrated in an open configuration. The open configuration of FIG. 8B enables simplified cleaning and maintenance of the tank.

Although the illustrated embodiment displays the fluid inlet 42 located vertically above the tank and the fluid outlet 44 located low down on the back wall, other configurations are also possible with the fluid inlet and outlet both capable of being located above or on any side wall of the header tank.

An alternative header tank configuration for controlling fluid level and meniscus pressure is illustrated in FIGS. 9A and 9B.

In the embodiments of FIGS. 9A and 9B, instead of an adjustable weir, the fluid outlet 44 itself is adjustable. For example, in the illustrated embodiment, both the fluid inlet 42 and the fluid outlet 44 are located vertically above the header tank 34, with the fluid outlet 44 being retractable or otherwise adjustable such that the level to which it reaches into header tank 34 is controllable. The level at which the fluid outlet 44 reaches down into the tank can thus be used to control the fluid level in the tank 34.

In FIG. 9A, the header tank 34 is illustrated in a closed configuration. In FIG. 9B header tank 34 is illustrated in an open configuration. The open configuration of FIG. 9B enables simplified cleaning and maintenance of the tank.

Referring now to FIG. 10, the digitally control of elements of the invention will be described in more detail.

As described above, the array of piezoactuated flow channel dispensers 14 are individually and independently controlled by a processor 50. Similarly, the flow of air 21 from the air dispensing element 18 is regulated by air flow controller 22, which is digitally controlled by a processor, which may be the processor 50 or a different processor. Further, the sensor 36 and recirculating feed 40 are both in communication with a processor that determines the above-mentioned feed rates and drain rates based on a reading from the sensor 36. The controlling processor may be processor 50 or a different processor.

In the illustrated embodiment, the same processor 50 is in communication with and in control of the array of piezoactuated flow channel dispensers 14, the air flow controller 22, and the sensor 36 and recirculating feed 40.

In an exemplary embodiment, the processor 50 corresponds to a microcontroller, a system on a chip or a single-board computer. The processor 50 includes a volatile memory, non-volatile memory, and an interface. In certain other embodiments, the processor 50 may include a plurality of volatile memories, non-volatile memories and/or interfaces. The volatile memory, non-volatile memory and interface communicate with one another via a bus or other form of interconnection. The processor 50 executes computer-readable instructions, e.g. one or more computer programs, for controlling certain aspects of the system described herein. The computer-readable instructions are stored in the non-volatile memory. The processor 50 is provided with power from a power source, which may include a battery.

The invention claimed is:

1. A printhead for dispensing a fluid, the printhead comprising:

at least one chamber;

an array of piezoactuated flow channel dispensers enclosed in the at least one chamber;

a multi-orifice dispensing plate;

an air dispensing element comprising a source of compressed air and an air flow controller configured to direct a flow of air, and a sealing layer configured to resist fluid flow through the orifices of the multi-orifice dispensing plate, wherein the tips of the flow channel dispensers are configured to protrude through the multi-orifice dispensing plate, and are configured to be in contact with and to protrude through openings in the sealing layer.

2. The printhead of claim 1, further comprising a processor configured to control each piezoactuated flow channel dispenser independently.

3. The printhead of claim 2, wherein the velocity of fluid dispensed by the printhead is controllable by a voltage determined by the processor.

4. The printhead of claim 2, wherein the processor is configured to control a spread of dispensed fluid based on a digital image.

5. The printhead of claim 2, wherein the piezoactuated flow channel dispensers are controllable based on real-time feedback received by the processor, the real-time feedback including at least one of:

a. coat weight detection;

b. colour detection;

C. flow rate detection;

d. nozzle resonant frequency; and e. electrical drive requirements for each nozzle.

6. The printhead of claim 1, wherein the air dispensing element is configured to direct a flow of air against the dispensing tips of the flow channel dispensers and/or substantially parallel to the flow of fluid dispensed from the flow channel dispensers to deflect the dispensed fluid in a controlled manner.

7. The printhead of claim 1, wherein the air dispensing element is configured to apply the flow of air periodically at a frequency in the range of 1-1,000 Hz.

8. The printhead of claim 1, wherein the or each chamber comprises a fluid of known composition and flow profile such that there is a controlled pressure in the chamber that can be negative or positive.

9. The printhead of claim 1, wherein the tips of the flow channel dispensers are further configured to move relative to the sealing layer with minimal friction or mechanical resistance when piezoelectronically actuated.

10. The printhead of claim 1, wherein the sealing layer is a viscoelastic membrane comprising multiple openings, the membrane covering each orifice of the multi-orifice dispensing plate, and wherein a diameter of each opening of the membrane through which the flow channel dispensers are configured to protrude is smaller than the diameter of the tip of the flow channel dispensers.

11. The printhead of claim 1, wherein the sealing layer, multi-orifice dispensing plate and/or the tips of the flow channel dispensers are/is composed of a non-wetting elastomer and/or provided with a non-wetting coating.

12. The printhead of claim 1, wherein a flow rate through a given flow channel dispenser is controllable by a duty cycle of the given flow channel dispenser.

13. The printhead of claim 1, wherein the printhead further comprises an additional chamber enclosing the tips of the flow channel dispensers.

14. A system for supplying a plurality of printheads the printheads comprising:
- at least one chamber;
- an array of piezoactuated flow channel dispensers enclosed in the at least one chamber;
- a multi-orifice dispensing plate; and
- an air dispensing element comprising a source of compressed air and an air flow controller configured to direct a flow of air, the system comprising:
- a plurality of tanks for holding fluid to be dispensed from the plurality of printheads;
- a fluid supply chamber;
- a sensor for detecting a fluid level in the fluid supply chamber; and
- a recirculating feed for controlling a feed rate and drain rate between the fluid supply chamber and each of the plurality of tanks, wherein the fluid feed rate and the fluid drain rate are determined by a processor based at least in part on the fluid level detected by the sensor.

15. The system of claim 14, wherein the recirculating feed is configured such that the feed rate and drain rate between the fluid supply chamber and each of the plurality of tanks is the same for each tank.

16. The system of claim 14, wherein the sensor is a capacitive sensor, and wherein the system is configured to:
- in response to the sensor switching on, increase the feed rate to each of the plurality of tanks and decrease the drain rate from each of the plurality of tanks; and
- in response to the sensor switching off, decrease feed rate to each of the plurality of tanks and increase the drain rate from each of the plurality of tanks.

17. The system of claim 14, wherein the sensor is a pressure sensor, and wherein the system is configured to:
- in response to the sensor detecting a low pressure, increase the feed rate to each of the plurality of tanks and decrease the drain rate from each of the plurality of tanks; and
- in response to the sensor detecting a high pressure, decrease feed rate to each of the plurality of tanks and increase the drain rate from each of the plurality of tanks.

18. The system of claim 14, wherein fluid flow paths connect an inlet and an outlet of each of the plurality of tanks to the fluid supply chamber, and wherein the fluid flow paths for each tank are of equal resistance.

19. The system of claim 18, wherein the outlet of each tank is located at a higher level than the inlet of each tank and creates a maximum fluid level for each tank based on the principle of a weir.

20. The system according claim 18, wherein each of the plurality of tanks further comprises a vacuum bleed valve located adjacent to the tank inlet, the vacuum bleed valve configured to provide a low resistance flow path if pressure in the tank exceeds a predetermined limit.

21. The system according to claim 14, wherein the system further comprises at least one vacuum pump configured to control the pressure in each of the plurality of tanks.

22. The system according to claim 21, wherein the vacuum pump is a closed loop pressure control, with a latency of less than 1 second per adjustment.

23. The system according to claim 14, wherein each tank of the plurality of tanks further comprises an adjustable partition configured to control the fluid level in its respective tank based on the principle of a weir.

24. The system according to claim 14, wherein the fluid outlet of each tank of the plurality of tanks is adjustable and configured to control the fluid level in its respective tank by adjust the level at which fluid is drained.

25. The system according to claim 14, further comprising a pump configured to recirculate fluid within each tank.

* * * * *